Figure 1:
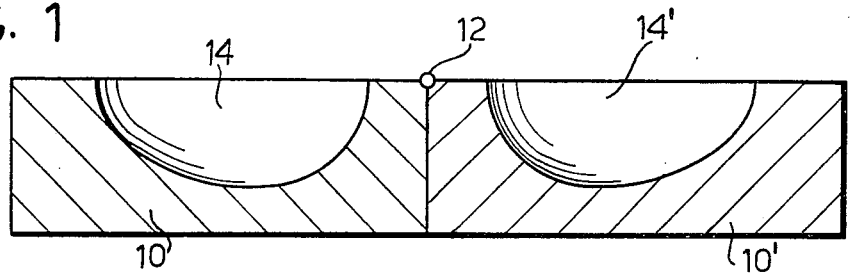

:::
United States Patent [19]

Dogliotti

[11] 3,961,089

[45] June 1, 1976

[54] METHOD OF MANUFACTURE OF HOLLOW CHOCOLATE ARTICLES

[75] Inventor: Amilcare Dogliotti, Neive, Italy

[73] Assignee: P. Ferrero & C. S.p.A., Alba, Cuneo, Italy

[22] Filed: July 24, 1974

[21] Appl. No.: 491,576

[30] Foreign Application Priority Data
July 30, 1973 Italy................................. 69289/73

[52] U.S. Cl............................... 426/274; 426/103; 426,104/; 426/306; 426/307; 264/255; 156/245; 264/248
[51] Int. Cl.²........................................... A23G 1/00
[58] Field of Search........... 426/103, 104, 274, 303, 426/304, 305, 306, 307; 264/248, 255

[56] References Cited
UNITED STATES PATENTS
3,246,069   4/1966   Maynord............................. 264/255

OTHER PUBLICATIONS
Daniel, Up to Date Confectionery, 4th Ed., 1965, MacClaren & Sons Ltd., Surrey, England, pp. 476–481.

Primary Examiner—Joseph M. Golian
Attorney, Agent, or Firm—Sughrue, Rothwell, Mion, Zinn & Macpeak

[57] ABSTRACT

A hollow chocolate article such as an Easter egg is formed by inverting a molded chocolate shell upon another shell in respective molds, the lower shell having been previously formed with an inner coating layer e.g., of chocolate, while the inverted upper shell is provided with an inner coating layer which is still in a fluid state when the shells are superimposed, so that some of the material of the inverted inner layer flows on to and is welded to the peripheral surface of the previously formed inner layer of the lower shell, to form an internal seam without discoloration.

2 Claims, 2 Drawing Figures

METHOD OF MANUFACTURE OF HOLLOW CHOCOLATE ARTICLES

This invention concerns the manufacture of hollow chocolate articles by preforming two shells of chocolate then joining the two shells together. A typical example of such articles is the familiar chocolate Easter egg.

In the manufacture of hollow chocolate eggs, the two component shells, pre-formed in respective molds, are softened along their edges by warming, after which the two molds are brought together so as to reconstruct the entire egg and cause the edge of one shell to weld itself to the edge of the other shell. The main disadvantage of this method of manufacture is that the thermal softening of the edges of the shells "melts" the chocolate, so that the whole welding area as well as the interior of the shells are affected in time by a change of color, thus giving the impression of a defective chocolate.

The main object of this invention is to provide a method of manufacture avoiding the abovementioned disadvantage.

According to the invention there is provided a method of manufacturing hollow chocolate articles, comprising preforming two chocolate shells and subsequently joining the shells together, wherein the improvement consists in coating each of the two shells on the inside with a molten layer of edible material and joining together the two shells by reciprocal welding together of the two inner layers whilst at least one of said layers is still in a sufficiently fluid condition for welding to the other inner layer.

In a preferred method according to the invention one of the two inner layers is caused to set by cooling and the shell thus coated is kept with its hollow side turned upwards, while the other shell, with its inner coating layer still in a fluid state, is inverted upon the said one shell and retained in this position so as to cause the material of the inverted fluid layer to flow over and adhere to the peripheral surface of the inner layer which has set. The two inner layers thus stuck together therefore form upon the said peripheral surface a welded seam, invisible from the outside but instantly recognisable if one cuts open the article transversely in the transverse "meridian" of the two shells.

Hollow articles made by the method of the present invention also have the advantage that they exhibit no change of color at the internal welded seam.

Preferably, in order to assist the flow of the material of the inverted fluid layer over the peripheral surface of the set layer, the two superimposed shells are subjected to vibration.

The invention will be further explained, by way of non-limiting example, with reference to the accompanying drawings, in which:

FIGS. 1 – 5 are cross sections, each taken upon the same plane, of a pair of molds in the different stages of carrying out the method according to the invention, for the manufacture of an Easter egg.

Figure 5:
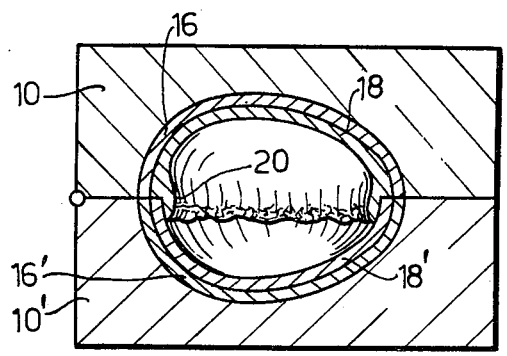

Referring to the drawings, reference numerals 10 and 10' indicate two metal molds which are hinged together like a book by means of a hinge 12 and can be moved into the closed position shown in FIG. 5. The molds 10 and 10' are formed with mold cavities 14 and 14' disposed symmetrically with respect to the hinge 12. The mold cavities 14, 14' are specularly identical to each other and are shaped to reproduce the two shells forming the halves of an Easter egg, which latter can have, for example, a diameter of about 5 cm and a length of about 7 cm. In the closed position of the molds 10, 10' (FIG. 5) the two cavities 14, 14' are disposed in exact register with each other and therefore define the shape of a whole egg.

Figure 2:
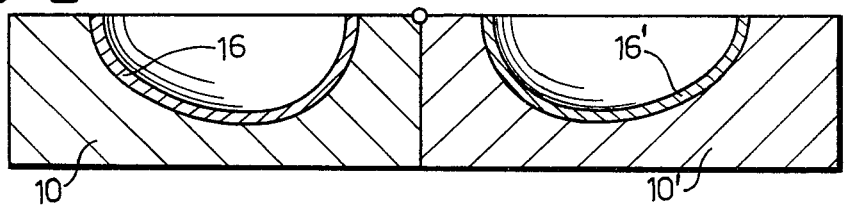
Figure 3:
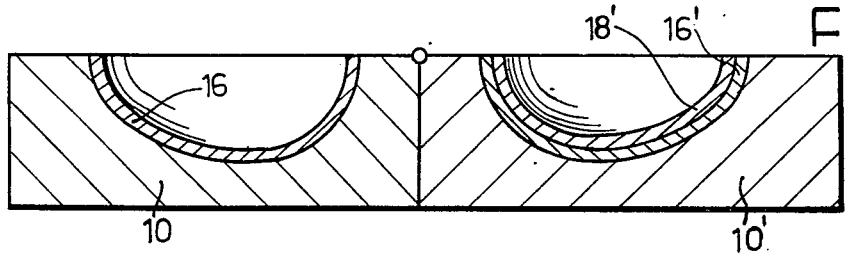
Figure 4:
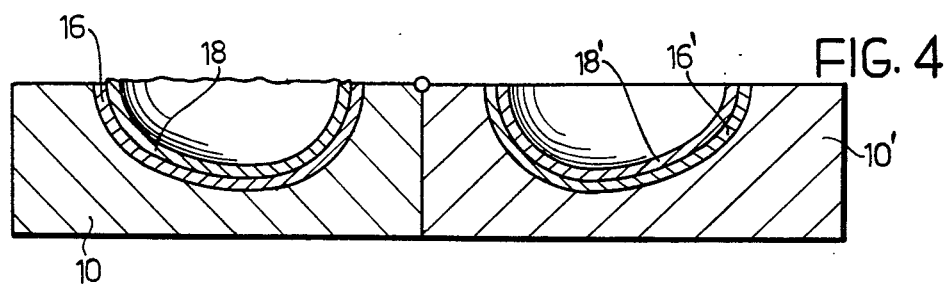

FIG. 1 shows the molds 10 and 10' in the open position. In each of the cavities 14, 14' there is already pre-formed, by known means, a chocolate shell, 16 and 16' respectively (FIG. 2). Each shell 16, 16' can be made, for example, of milk chocolate, which melts generally at about 28°–30°C. To form the two shells the cavities 14, 14' are filled with molten chocolate whilst the molds 10, 10' are at a temperature lower than the melting temperature, for example 25°C where the shells 16, 16' are of milk chocolate. Thus as the molten chocolate is poured into each cavity 14, 14' a layer solidifies upon contact with each mold to form the shells 16, 16', the surplus melted chocolate being poured from the molds 10, 10'. The thickness of each shell 16, 16' depends upon the time elapsing between the casting of the shell and the pouring off of the surplus chocolate. In the specific case considered here the thickness of each shell 16, 16' is typically about 1.5–2 mm.

The molds 10, 10' with the shells 16, 16' thus formed are cooled to a temperature such as to allow adhesion to the shells of the layers which subsequently form the inner coating without any danger of degradation of the shells due to the heat transferred thereto by the molten coating material. In the specific case under consideration the temperature to which the molds 10, 10' are cooled may be, for example, 20°–22°C. In these circumstances, molten material is poured into the shell 16', but not into the other shell 16, and forms an inner layer 18' in the shell 16' (FIG. 3), in the same manner as the formation of the shells 16, 16'.

The material which forms the inner layer 18' can also consist of chocolate, for example identical chocolate to that of the two shells 16, 16'. One can however use (for dietetic reasons, as well) a material poorer in cocoa and richer in milk, for example consisting essentially of powdered whole milk, cocoa butter and sugar, while being free of chocolate paste. Such material possesses the color of milk rather than the typical color of chocolate. The melting temperature of this material (pasted, homogenised and blended) is about 30°–31°C. In this case, also, after having poured the molten material into the shell 16', the material in contact with the shell sets to form the inner layer 18' and the excess material is poured off after a predetermined time when the layer 18' has been formed with the desired thickness, for example about 2 mm. The layer 18' after formation is immediately cooled so as to cause it to harden before the material flows by gravity to the bottom of the shell 16'.

If necessary the upper surface of the mold 10' is cleaned before the formation of an inner layer 18 in the shell 16. The layer 18 is formed in the same way as the the layer 18', but with this difference that, once the excess material is poured out from the shell 16, cooling is not effected although the mold 10 is inverted on to the mold 10' so that the freshly made layer 18 is situated above the previously formed layer 18'. Under these conditions (FIG.5) the material of the inverted layer 18 tends to flow downwards, and in so doing it welds on to the upper edge of the layer 18' as well as on to the adjacent inner peripheral surface of the layer 18', forming an internal welding seam 20. In order to facilitate this flow, the closed mold assembly shown in FIG. 5 should preferably be subjected to slight vibration.

At this stage it is simply necessary to cool the mold to a low temperature, typically 0° to - 5°C, as to permit removal of the complete egg from the mold.

What is claimed is:

1. A method of manufacturing hollow chocolate articles comprising forming two chocolate shells in complementary mold halves, coating each of said shells on the inside with a molten layer of edible material, cooling the layer in one of said shells to set, inverting the other shell while the layer is still flowable into complementary mating relation on top of the shell having the set layer therein, allowing the flowable layer to flow over the edge of the set layer and cooling both shells to set and secure together the overlapping inner layers and thereby hold said shells together.

2. The method as set forth in claim 1 further comprising vibrating said shells when said shells are in mating relation to assist the flow of said flowable layer over the edge of the set layer.

* * * * *